United States Patent [19]

Kawanabe et al.

[11] Patent Number: 5,268,551
[45] Date of Patent: Dec. 7, 1993

[54] WIRE ELECTRODE POSITIONING CONTROL DEVICE OF ELECTRICAL DISCHARGE WIRE-CUTTING MACHINE

[75] Inventors: Tasuku Kawanabe; Tetsuya Aoki, both of Nagoya, Japan

[73] Assignee: Brother Kogyo Kabushiki Kaisha, Nagoya, Japan

[21] Appl. No.: 874,017

[22] Filed: Apr. 27, 1992

[30] Foreign Application Priority Data

Aug. 12, 1991 [JP] Japan .................. 3-201983

[51] Int. Cl.⁵ .............................. B23H 7/10
[52] U.S. Cl. .................................. 219/69.12
[58] Field of Search .......... 219/69.12, 69.19; 242/155 R, 45

[56] References Cited

U.S. PATENT DOCUMENTS

| | | | |
|---|---|---|---|
| 4,412,118 | 10/1983 | Nomura et al. | 219/69.12 |
| 4,748,310 | 5/1988 | Aso et al. | 219/69.12 |
| 4,783,583 | 11/1988 | Obara et al. | 219/69.12 |
| 4,998,003 | 3/1991 | Kawanabe | 219/69.12 |
| 4,999,473 | 3/1991 | Gamo et al. | 219/69.12 |

FOREIGN PATENT DOCUMENTS

| | | | |
|---|---|---|---|
| 58-177234 | 10/1983 | Japan. | |
| 59-209725 | 11/1984 | Japan | 219/69.12 |
| 62-287934 | 12/1987 | Japan | 219/69.12 |
| 63-300823 | 12/1988 | Japan | 219/69.12 |
| 63-300824 | 12/1988 | Japan | 219/69.12 |
| 2-116423 | 5/1990 | Japan | 219/69.12 |
| 3-239422 | 10/1991 | Japan | 219/69.12 |

*Primary Examiner*—Geoffrey S. Evans
*Attorney, Agent, or Firm*—Oliff & Berridge

[57] ABSTRACT

While a workpiece is processed, a wire electrode is fed in the first direction by a drive roller from a wire bobbin energized in the second direction which is the reverse direction of the first direction. A brake roller installed between the wire bobbin and the drive roller supplies the wire electrode installed between the wire bobbin and the drive roller with additional tension. If the wire electrode is broken, the wire bobbin winds up the broken wire electrode. A wire end detecting sensor detects the end of the broken wire electrode when the wire electrode is wound up so that the end of the wire is stopped at a predetermined position.

18 Claims, 8 Drawing Sheets

WIRE ELECTRODE POSITIONING CONTROL DEVICE OF ELECTRICAL DISCHARGE WIRE-CUTTING MACHINE

BACKGROUND OF THE INVENTION

1. Field of the Invention

The invention is related to an electric discharge wire-cutting machine in which a pulse-like voltage is applied between a wire electrode and an electrified workpiece, to discharge a pulse therebetween, by which the workpiece is processed. In particular, the invention is related to a wire electrode positioning control device of the electric discharge wire-cutting machine which feeds the wire electrode in a backward direction and positions the end of the broken wire electrode at a predetermined position when the wire electrode is broken.

2. Description of Related Art

In a general electric discharge wire-cutting machine, a wire electrode is installed along guides installed on the upper side and the lower side of a workpiece. The workpiece is the other electrode. It is located between the upper guide and the lower guide and confronting with the wire electrode. When the electricity is discharged between the wire electrode and the workpiece, which is the other electrode, the workpiece is processed to an arbitrary shape. During processing, the wire electrode may be broken in the workpiece unless the cutting conditions, i.e., the tension of the wire electrode and the wire feeding speed are appropriate.

In the case of breakage of the wire electrode, it is general practice in the prior art to re-install the wire electrode manually and then restart cutting. This is very troublesome and reduces the efficiency of the cutting operation. To improve this, there is an electric discharge wire-cutting machine provided with a mechanism for automating the re-installation of the wire electrode.

When the wire electrode is re-installed automatically, the wire electrode has to be fed to a wire electrode winding reel, which is installed downstream of the direction of supply of the wire electrode.

The installation is done by positioning the end of the wire electrode at a predetermined position and feeding the wire electrode in the direction of the wire electrode winding reel. If the wire electrode is not wound up on the wire winding reel after a predetermined time, the end of the wire electrode has to be again positioned at the predetermined position and the wire electrode is then re-installed. The causes of the error can be that the wire electrode is not well guided by the guide or the wire electrode becomes entangled while it is fed to the wire electrode winding reel. In order to automate the re-installation of the wire electrode, there is a demand for positioning the end of the wire electrode at a predetermined position. U.S. Pat. No. 4,412,118 discloses an electric discharge wire-cutting machine which can position the end of the broken wire electrode at a predetermined position. This electric discharge wire-cutting machine is explained by referring to FIG. 8.

The wire electrode 101 is fed from a wire bobbin 115 to a wire winding reel 102 during processing as shown in FIG. 8. The feeding direction of the wire electrode 101 is called the wire supplying direction (direction C). The reverse direction of the direction C is the winding direction of the wire electrode 101, and it is called the wire winding direction (direction D).

A workpiece 101 is located between the wire bobbin 115 and the wire winding reel 102. The electricity is discharged between the wire electrode 101 and the energized workpiece 106 and the workpiece 106 is processed.

An auxiliary wire feeding device 120 is installed on the side of the direction D from the workpiece 106. When the wire electrode 101 is broken, the auxiliary wire feeding device 120 positions the end of the wire electrode 101 at a predetermined position.

Both of a drive roller 111 and a pinch roller 110 of the auxiliary wire feeding device 120 can contact and separate from the wire electrode 101.

When the wire electrode 101 is fed in the direction C, the drive roller 111 and the pinch roller 110 are separated from the wire electrode 101.

If a breakage of the wire electrode 101 is detected by a breakage sensor 117, which is installed on the side of the direction C from the workpiece 106, the wire electrode 101 is sandwiched between the drive roller 111 and the pinch roller 110. A motor 112 rotates the drive roller 111 and the wire electrode 101 is fed in the direction D. When the end of the broken wire electrode 101 is detected by a wire end detecting sensor 109, a control device 119 stops the rotation of the motor 112. Therefore, the end of the broken wire electrode is positioned at a predetermined position.

In the above-mentioned electric discharge wire-cutting machine, the auxiliary wire feeding device 120 which consists of the motor 112, the drive roller 111, and the pinch roller 110 is necessary to feed the broken wire electrode 101 in the direction D. Therefore, there is a problem that the structure of the device is complex.

In this auxiliary wire feeding device 120, since the drive roller 111 and the pinch roller 110 have to be released from the wire electrode 101 to feed the wire electrode 101 in the direction C during processing of the workpiece, there is the problem that a releasing mechanism is also necessary.

In this auxiliary wire feeding device 120, when the broken wire electrode 101 is wound up, a sag in the wire electrode 101 is generated between the auxiliary wire feeding device 120 and the wire feeding reel 115 which supplies the wire electrode 101. Therefore, there is also a problem that the wire electrode 101, which is installed between the auxiliary wire feeding device 120 and the wire feeding reel 115, is derailed and it cannot be re-installed automatically.

SUMMARY OF THE INVENTION

It is an object of the invention to use the energization power of the wire electrode winding means, which energizes the wire electrode in the reverse direction of the wire electrode supplying direction, to wind up the wire electrode and position the end of the wire electrode at the predetermined position in a case of breakage of the wire electrode, that is, to position the end of the wire electrode at the predetermined position with a simple construction.

It is another object of the present invention to stop the energization power of the wire electrode winding means, which energizes the wire electrode in the reverse direction of the wire electrode supplying direction, in the case of breakage of the wire electrode and to wind up the wire electrode and position the end of the wire electrode at the predetermined position, that is, to position the end of the wire electrode at a predetermined position while preventing the generation of any sag and the derailment of the wire electrode.

The electric discharge wire-cutting machine with which a workpiece, fed in the first direction, is processed to an arbitrary shape by the pulse discharge generated by applying a voltage between the wire electrode and the workpiece comprises: a wire feeding means for feeding the wire electrode in the first direction when a workpiece is processed, a wire winding means for energizing a wire electrode in the second direction which is the reverse direction of the first direction, a tension supplying means installed between the wire feeding means and the wire winding means for supplying the wire electrode with the passing resistance to give tension to the wire electrode on the side of the wire feeding means, a wire breakage detecting means for detecting breakage of the wire electrode, and a wire end detecting means for detecting the end of the broken wire electrode. If the breakage of the wire electrode is detected by the wire breakage detecting means, the broken wire electrode is wound up in the second direction by the energizing power of the wire winding means. The end of the broken wire electrode is positioned at a predetermined position by detecting the end of the broken wire electrode by the wire end detecting means.

With the above-mentioned structure, when the wire breakage detecting means detects breakage of the wire electrode, the wire winding means winds up the broken wire electrode and the wire end detecting means detects the end of the broken wire electrode.

As to the electric discharge wire-cutting machine of the invention, if the wire breakage detecting means detects breakage of the broken wire electrode, the end of the wire electrode is positioned at a predetermined position with a simple construction, and the generation of any sag and the derailment of the wire electrode is further prevented.

BRIEF DESCRIPTION OF THE DRAWINGS

The invention will be described with reference to the figures, in which.

DETAILED DESCRIPTION OF THE PREFERRED EMBODIMENTS

Figure 1:
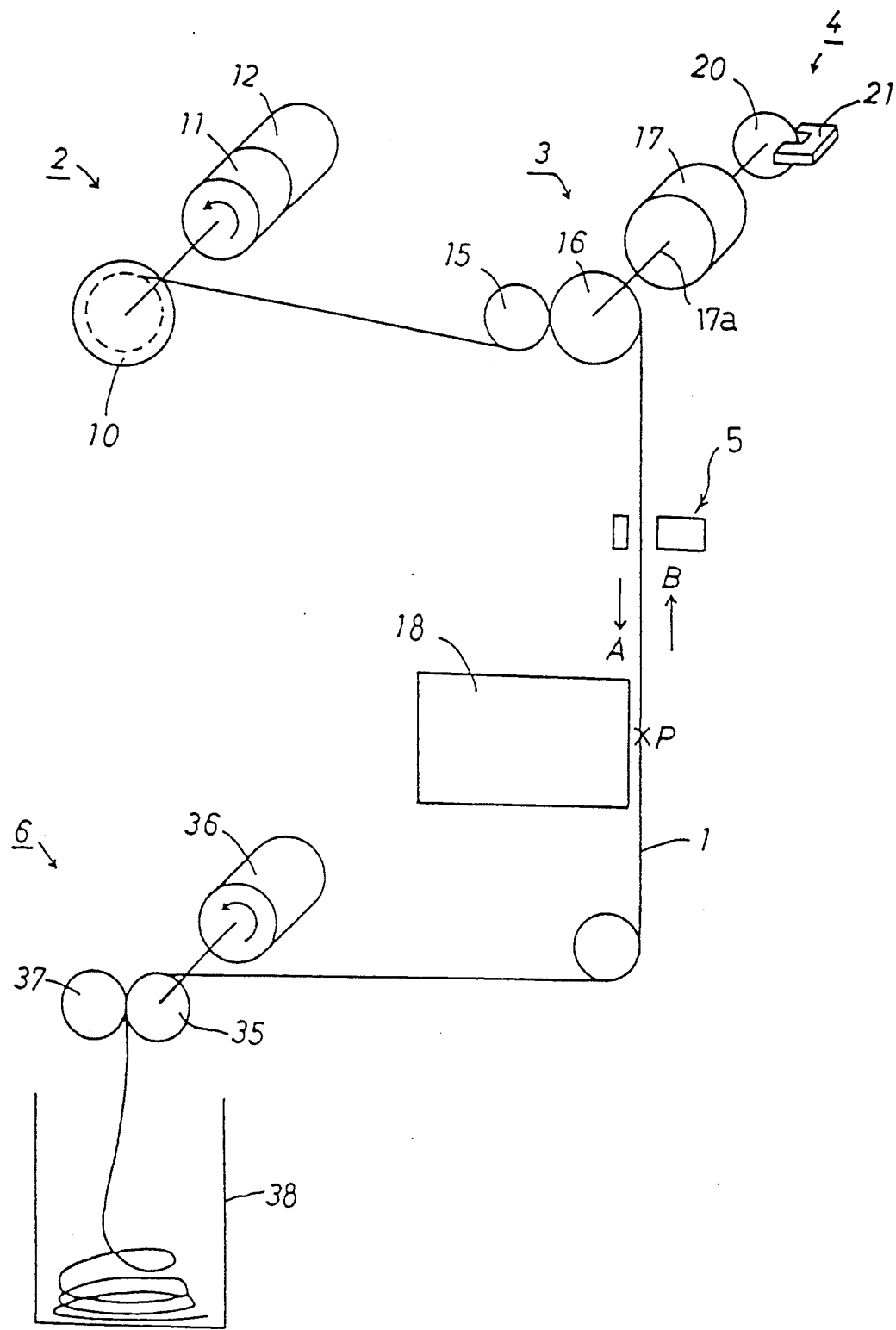
FIG. 1 is a schematic diagram of the structure of the electric discharge wire-cutting machine of the first embodiment.

Hereafter, the first embodiment of the electric discharge wire-cutting machine will be explained using FIGS. 1-4.

The electric discharge wire-cutting machine of the first embodiment feeds a wire electrode 1 in the wire supplying direction (shown in FIG. 1) during processing. The electric discharge wire-cutting machine comprises following members. A sub-tension generating mechanism 2 for generating tension for the wire electrode 1 between a wire bobbin 10 and a brake roller 16, a main tension generating mechanism 3 for generating tension for the wire electrode 1 between a brake roller 16 and a drive roller 35, a breakage detecting mechanism 4 for detecting breakage of the wire electrode 1, a wire end detecting sensor 5 for detecting the end of the broken wire electrode 1, and a wire collecting mechanism 6 for storing used wire electrode 1.

The sub-tension generating mechanism 2 comprises a wire bobbin 10 having the wire electrode 1 to be fed wound thereon, a back tension motor 11 for energizing the wire bobbin 10 in the wire winding direction (direction B), and an electromagnetic brake 12 for stopping the rotation of the back tension motor The back tension motor 11 gives the wire bobbin 10 a counterclockwise rotation power as shown in FIG. 1. Therefore, the wire electrode receives a torque in the direction B and the wire electrode 1 installed between the wire bobbin 10 and the brake roller 16 does not sag.

The wire electrode 1 is successively drawn from the wire bobbin 10 to the brake roller 16 side during processing of the workpiece. In case of a breakage of the wire electrode, the rotation of the wire bobbin 10 is momentarily stopped by the electromagnetic brake 12. Afterwards, the back tension motor 11 rotates the wire bobbin 10 counterclockwise and the wire electrode 1 is wound up.

The main tension generating mechanism 3 consists of the pinch roller 15, the brake roller 16, and the tension brake 17. The wire electrode 1 is sandwiched between the brake roller 16 and the pinch roller 15. When the friction torque generated by the tension brake 17 connected with the brake roller 16 is controlled, a desired tension is applied to the wire electrode 1 which is installed between the brake roller 16 and the drive roller 35. That is, the tension brake 17 changes the friction torque by changing the amount of the magnetic powder of the magnetic powder brake used as the tension brake 17. Therefore, the main tension of the wire electrode 1 between the brake roller 16 and the drive roller 35 changes.

The breakage detecting mechanism 4 is installed on the shaft 17a of the tension brake 17 of the main tension generating mechanism 3. The breakage detecting mechanism 4 comprises an interrupter 20 on which many slits are formed and a photo sensor 21 installed adjacent to the interrupter 20. For example, if the wire electrode 1 is broken in position P, the rotation of the brake roller 16 stops and the rotation of the shaft 17a of the tension brake 17 also stops. The breakage of the wire electrode 1 is detected by detecting the stoppage of the interrupter 20 which rotates with the rotation of the shaft 17a.

The wire end detecting sensor 5 is installed between the brake roller 16 and the workpiece 18. The wire end detecting sensor 5 is a photosensor of a reflecting type, and while the wire electrode 1 is passing through the wire end detecting sensor 5, the sensor is ON. The moment the wire electrode 1 no longer passes through the wire end detecting sensor 5, the output from the wire end detecting sensor 5 becomes OFF, from ON, as the wire end detecting sensor 5 has detected the end of the wire electrode 1.

The wire collecting mechanism 6 is comprised of the drive roller 35 for feeding the wire electrode 1 in the direction A, a servo motor 36 for driving the drive roller 35, a pinch roller 37 for pinching the wire electrode 1 with the drive roller 35, and a collecting basket 38 for storing used wire electrode 1. The servo motor 36 drives the drive roller 35 with stronger torque than the amount of the torque by which the back tension motor 11 winds up the wire electrode 1 in the direction B and the friction torque by which the tension brake 17 resists the movement of the wire electrode 1 in the direction A. Therefore, if the wire electrode is wound up by the drive roller 35 while processing, the wire electrode 1 is drawn from the wire bobbin 10 and fed in the direction of arrow A. The rate or speed of the clockwise rotation of the wire bobbin 10 during processing is greater than that of the counterclockwise rotation rate of the wire bobbin 10 generated by the back tension motor 11 in case of a wire breakage.

Figure 2:
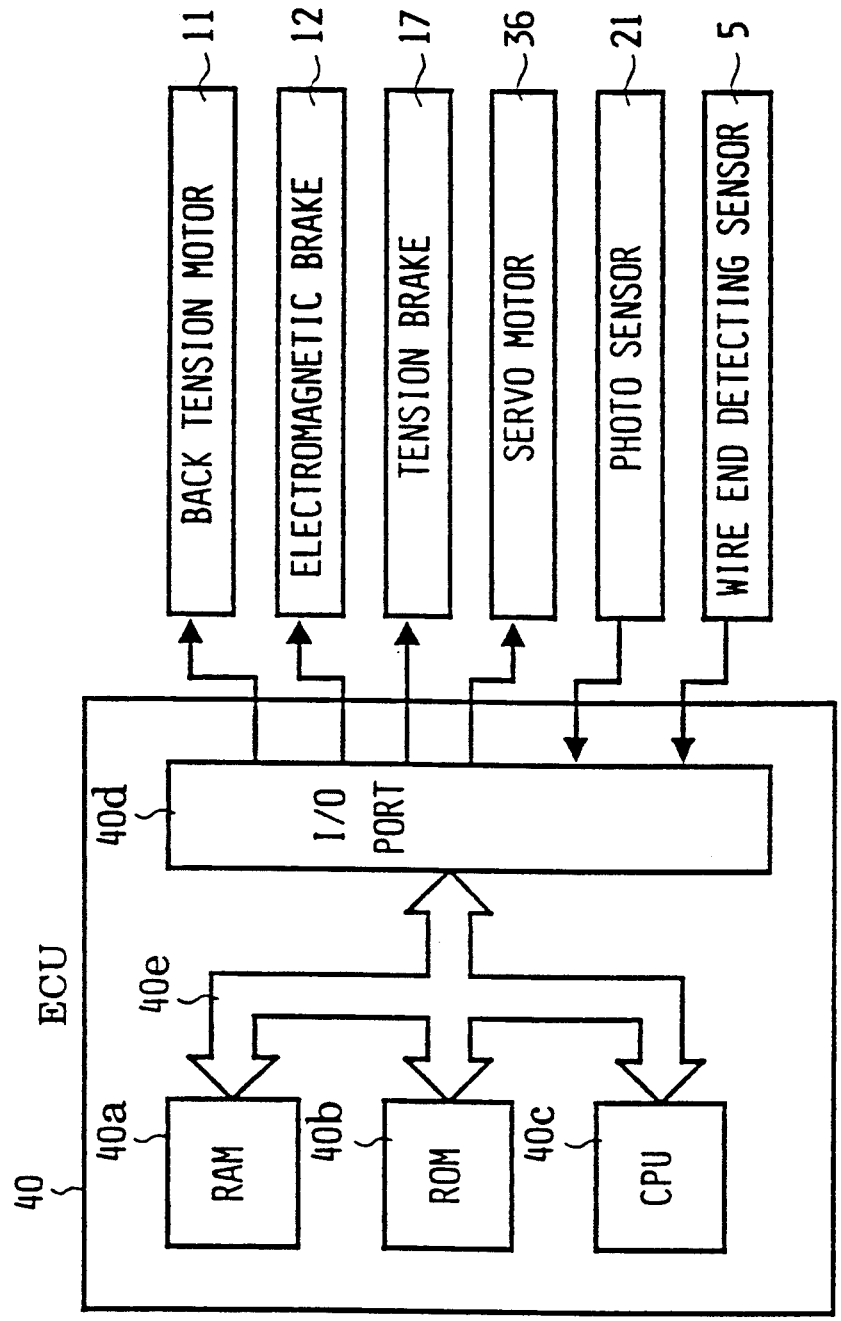
FIG. 2 is a block diagram of the electrical structure of the electric discharge wire-cutting machine.

FIG. 2 is a block diagram which shows the electrical structure of the electric discharge wire-cutting machine of the first embodiment. Each mechanism mentioned above is controlled by an electric control unit (ECU) 40.

The ECU 40 comprises a RAM 40a, ROM 40b, CPU 40c, I/O port 40d, and bus line 40e. The back tension motor 11, the electromagnetic brake 12, the tension brake 17, the servo motor 36, the photo sensor 21, and the wire end detecting sensor 5 are connected to the I/O port 40d. The back tension motor 11, the electromagnetic brake 12, the tension brake 17, the servo motor 36, the photo sensor 21, and the wire end detecting sensor 5 are controlled by the ECU 40.

Figure 3:
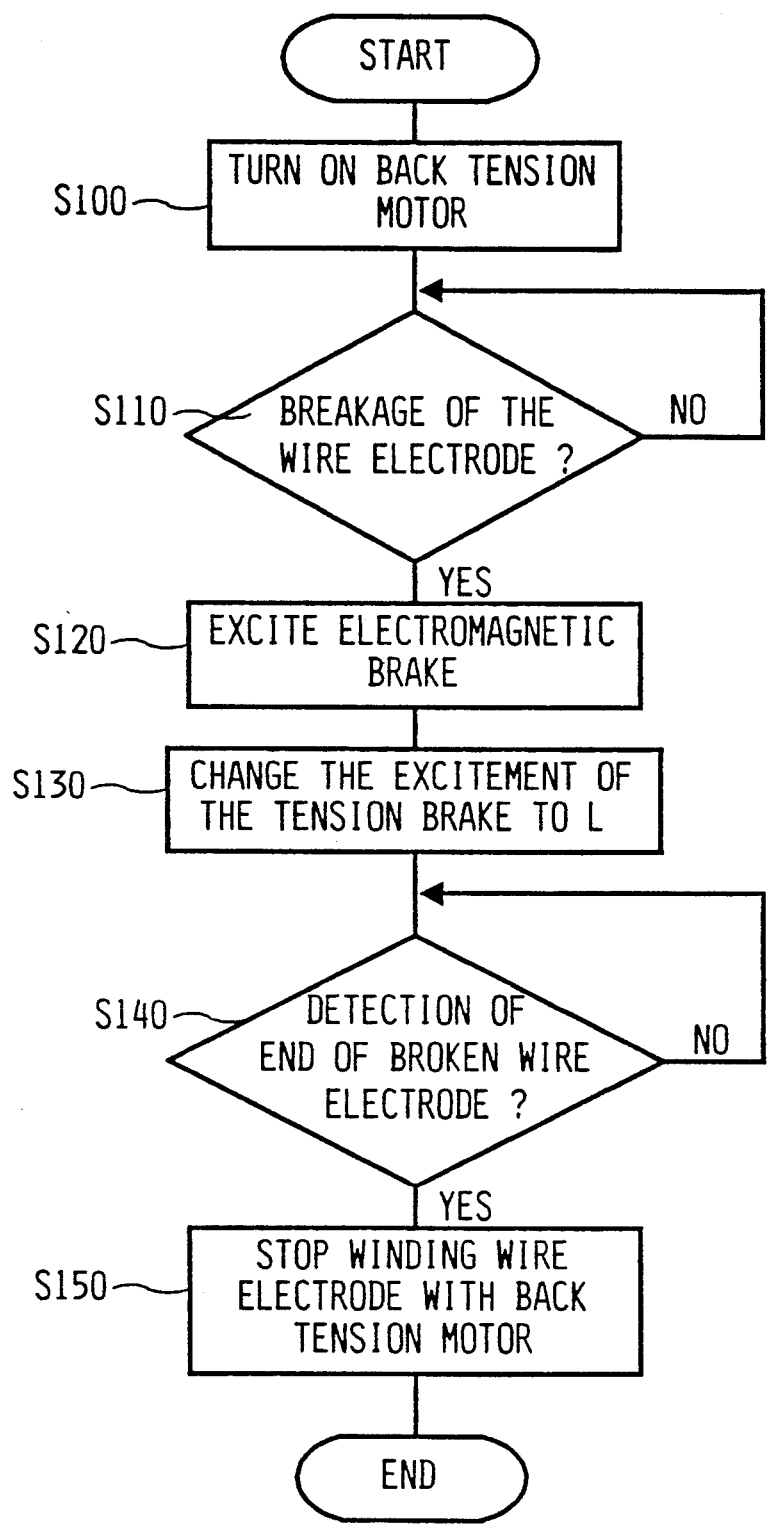
FIG. 3 is a flowchart of the control of the electric discharge wire-cutting machine.
Figure 4:
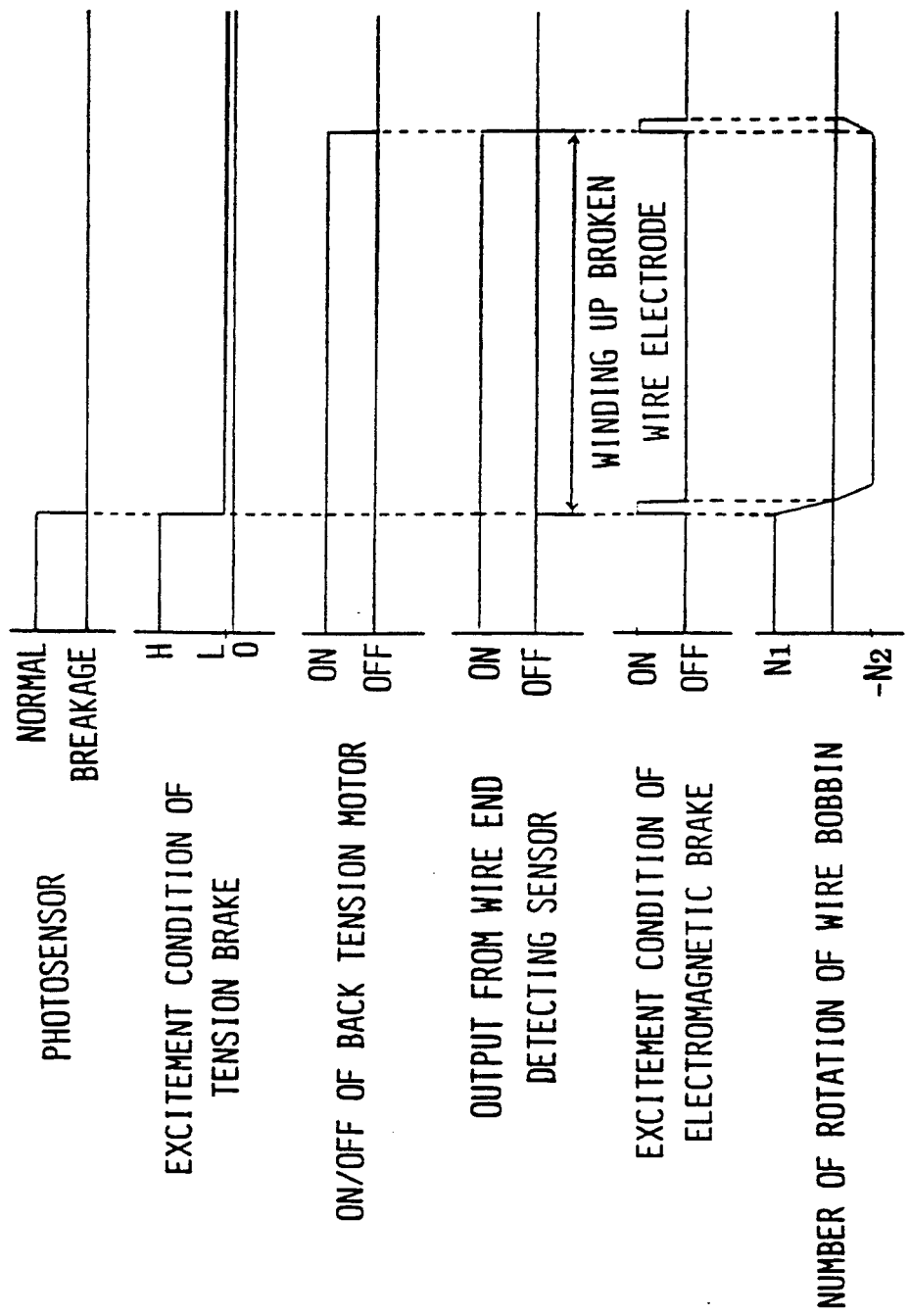
FIG. 4 is a timing chart of the timing of the control of the electric,. discharge wire-cutting machine.

FIG. 3 is a flowchart which shows the control of the wire electrode positioning control device of the electric discharge wire-cutting machine of the first embodiment and FIG. 4 is a timing chart which shows the timing of the control.

While a workpiece 18 is processed, the back tension motor 11 becomes ON in S100 and the wire bobbin 10 is energized in the counterclockwise direction.

CPU 40c determines whether the wire electrode I is broken or not in S110 based on the output from the photo sensor 21 of the breakage detecting mechanism 4.

If a breakage of the wire electrode is detected, S110 is followed by S120.

The electromagnetic brake 12 is momentarily excited and the brake is applied to the back tension motor 11 in S120, as shown in FIG. 4, stopping the clockwise rotation of the wire bobbin 10.

The wire bobbin 10 stops because when the wire electrode 1 is broken, the brake roller 16 stops due to the tension brake 17. However, even with the brake roller 16 stopped, the wire bobbin 10 would feed the wire electrode 1 by inertia and the wire electrode 1 between the wire bobbin 10 and the brake roller 16 would sag because the brake roller 16 has stopped. In order to prevent the wire electrode from having any sag between the wire bobbin 10 and the brake roller 16, the electromagnetic brake 12 is momentarily excited and the rotation of the wire bobbin 10 stops.

In S130, CPU 40c changes the excitement condition of the tension brake 17 from a large set value H to a small set value L. This allows wire electrode 1 to be wound up smoothly because of the decreased frictional force of the tension brake 17.

When the tension brake 17 is loosened, the wire bobbin 10 is rotated by the back tension motor 11 in the counterclockwise direction, because the momentary excitement of the electromagnetic brake 12 has ended, at the smaller rotation speed N2 than that of the rotation speed N1 of wire feeding. As a result, the wire electrode 1 is wound up in the direction B at the low speed.

In S140, CPU 40a determines whether the end of the wire electrode 1 is detected or not, that is, whether the end of the wire electrode 1 is wound up to a predetermined position or not, based on the output from the wire end detecting sensor 5. When the CPU 40c detects the end of the wire electrode 1, S140 is followed by S150.

In S150, the CPU 40c stops the drive of the back tension motor 11 to stop the winding up of the wire electrode 1 and ends this process based upon the detection of the end of the wire electrode 1. At this time, the end of the wire electrode 1 stops accurately at a predetermined position because the wire electrode is wound up at the low speed.

In the first embodiment, when breakage of the wire electrode 1 is detected, the wire bobbin 10 momentarily stops its rotation. At the same time the tension brake 17 is loosened and the wire electrode 1 is wound up in the direction B at the low speed. When the end of the wire electrode 1 is detected, the wire electrode 1 is stopped from being wound up.

Therefore, it is prevented that the wire electrode 1 has any sag between the wire bobbin 10 and the brake roller 16 in the case of a breakage and a derailment of the wire electrode 1 from the brake roller 16 and the pinch roller 15 is prevented. Further, because the wire electrode 1 is wound up at the low speed, it can be accurately positioned at the predetermined position. Lastly, in the positioning control device of the electric discharge wire-cutting machine of the first embodiment, a conventional auxiliary feeding device 120 is not needed as a positioning mechanism so the positioning control device provides the advantage that it is a simple construction and has few breakdowns.

A second embodiment will now be explained with reference to FIGS. 5-7.

Figure 5:
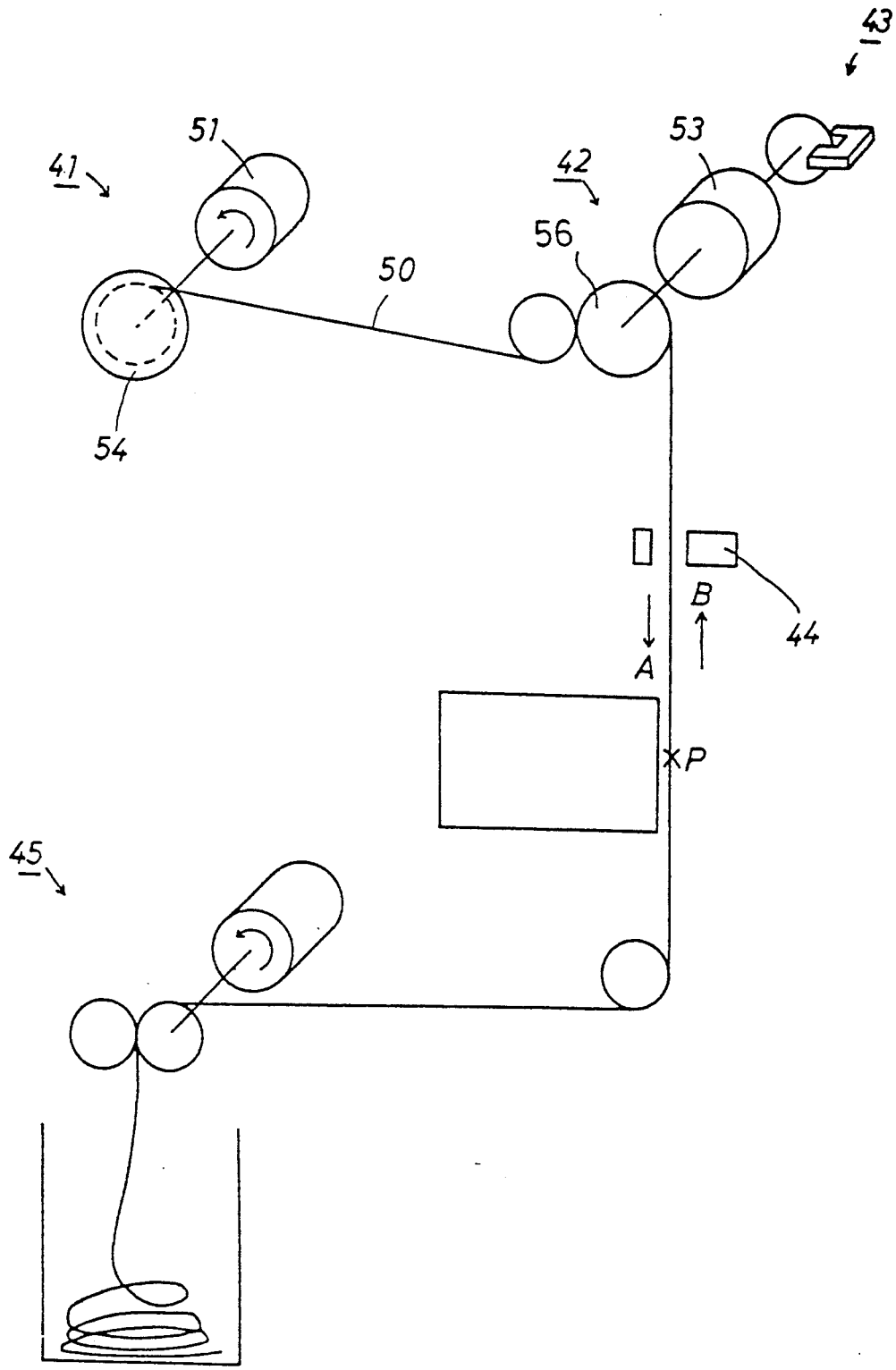
FIG. 5 is a schematic diagram of the structure of a second embodiment of the electric discharge wire-cutting machine.

As shown in FIG. 5, the electric discharge wire-cutting machine of the second embodiment is comprised of a sub-tension generating mechanism 41, a main tension generating mechanism 42, a breakage detecting sensor mechanism 43, a wire end detecting sensor 44, and a wire collecting mechanism 45 which are almost the same as those of the first embodiment. However, an electromagnetic brake to stop a back tension motor 51 is not installed in the electric discharge wire-cutting machine of this second embodiment and that provides the primary difference from the first embodiment.

Figure 6:
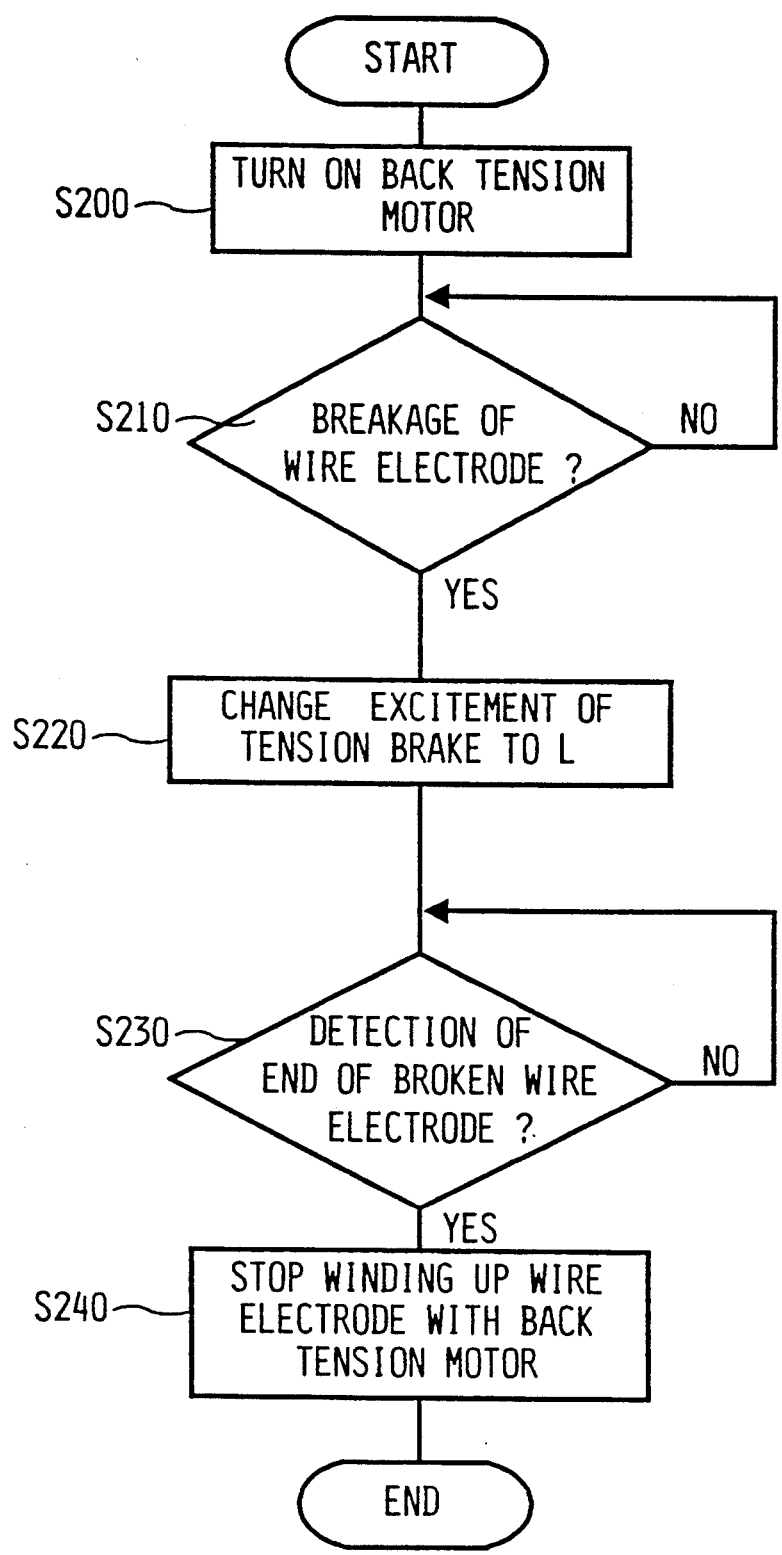
FIG. 6 is a flowchart of the control of the second embodiment.
Figure 7:
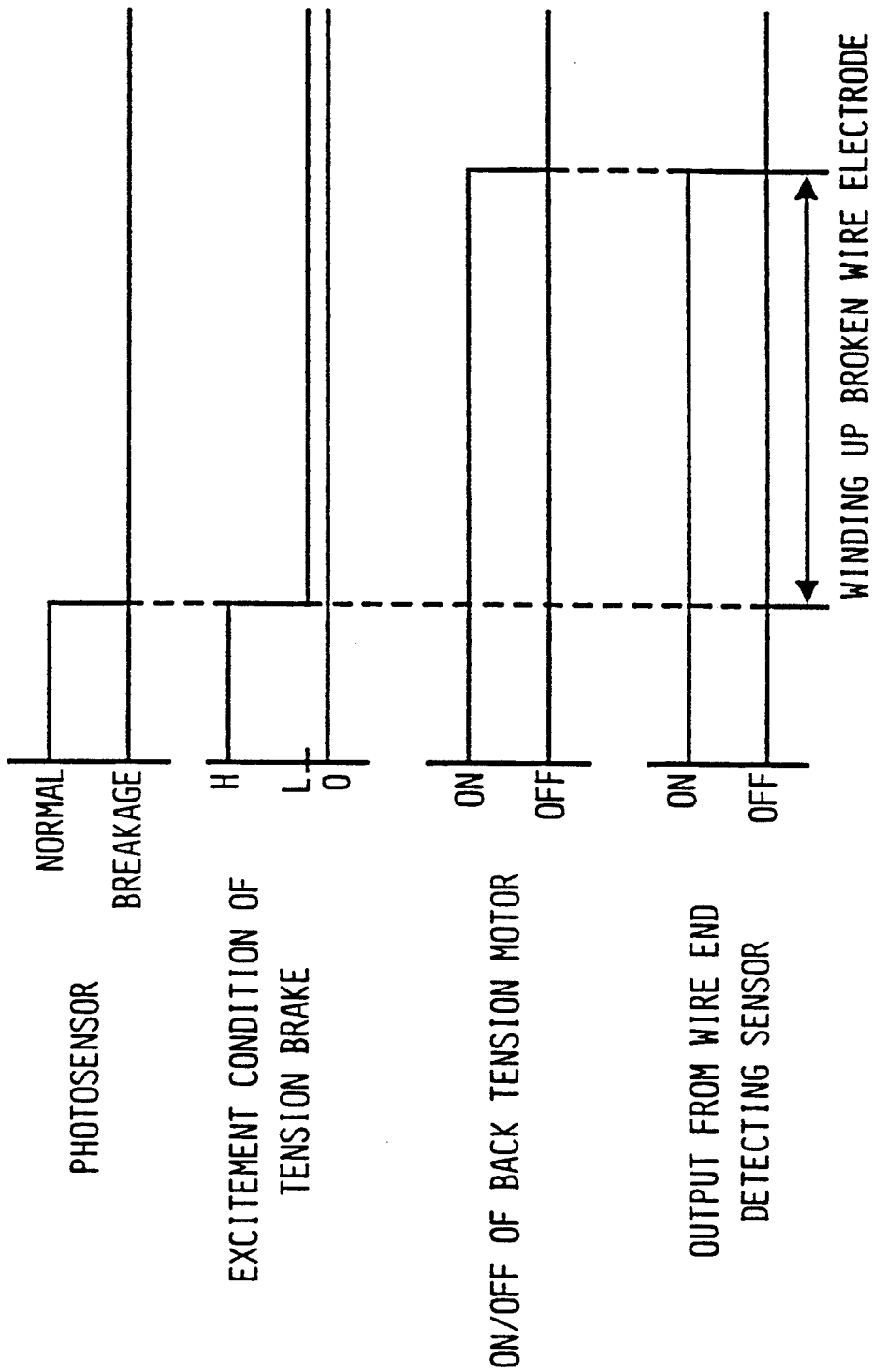
FIG. 7 is a timing chart of the timing of the control of the second embodiment.
Figure 8:
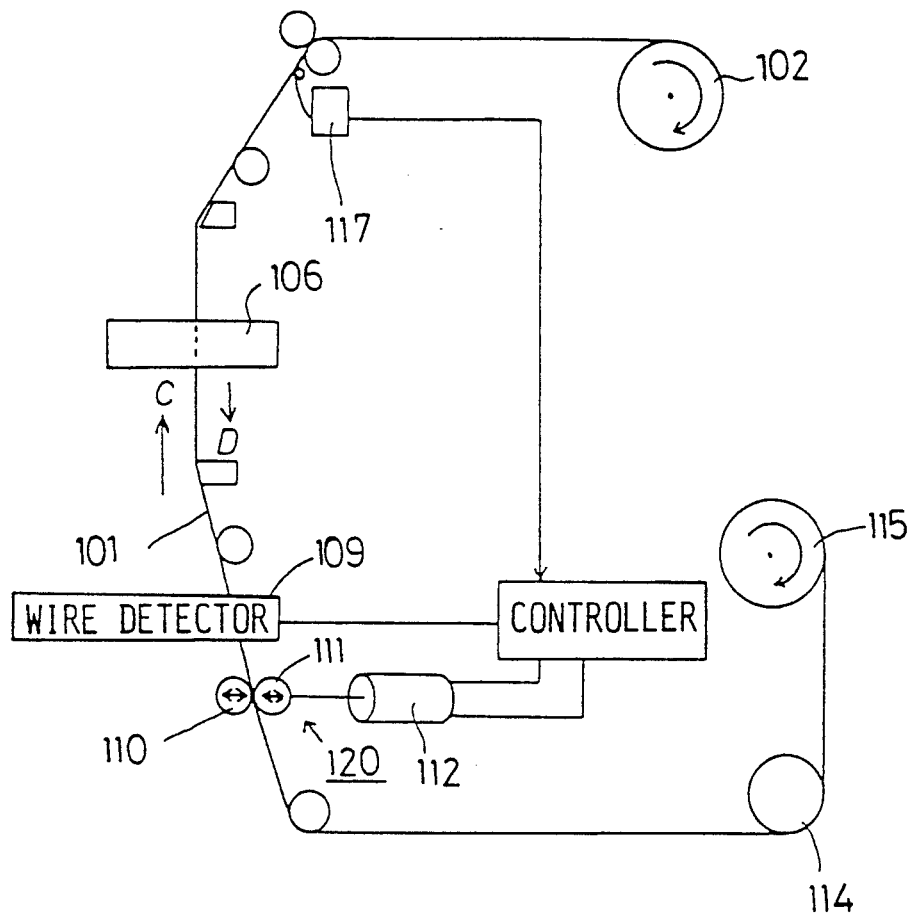
FIG. 8 is schematic diagram of the related art.

FIG. 6 is a flowchart which shows the control of the wire electrode positioning control device of the electric discharge wire-cutting machine of the second embodiment and FIG. 7 is a timing chart which shows the timing of the control. The portions of the explanation of the second embodiment that are similar to that of the first embodiment are omitted.

The wire electrode 50 is fed in the direction A during processing. In S200, CPU 40c turns ON the back tension motor 51. In S210, CPU 40c determines whether the wire electrode 50 is broken or not by means of the breakage detecting mechanism 43. If the CPU 40c determines the wire electrode is broken, the tension brake 53 is loosened in S220. Therefore, the wire electrode 50 is wound up in the direction B at the low speed by the wire bobbin 54 driven by the back tension motor 51.

In S230, CPU 40c determines whether the end of the wire electrode 50 is detected or not. When the end of the wire electrode 50 is detected and CPU 40c determines that the end of the wire electrode 50 has reached a predetermined position, S230 is followed by S240.

In S240, CPU 40c stops the drive of the back tension motor 51 and stops winding up the wire electrode 50 upon detection of the end of the wire electrode 50. At this time, the end of the wire electrode 50 stops accurately at a predetermined position because the wire electrode 50 is wound up at the low speed.

As mentioned above, in the second embodiment, an electromagnetic brake is not present to stop the rotation of the wire bobbin 54 in the case of a breakage, but the wire electrode 50 is only wound up by the back tension motor 51 in case of breakage. Because the sag between the wire bobbin 54 and the brake roller 56 is small when the feeding speed of processing is slow, the rotation of the wire bobbin 54 does not need to be stopped by an electromagnetic brake. Therefore, the structure of the second embodiment, without the electromagnetic brake, is sufficient. In addition, because the winding speed is slow, the end of the wire electrode 50 is accurately positioned. There is an advantage that the electric discharge wire-cutting machine of the second embodiment has a very simple structure and few breakdowns as is the case in the first embodiment.

It is to be understood that the invention is not restricted to the particular forms shown in the foregoing first and second embodiments, and various modifications and alternations can be added thereto without departing from the scope of the invention.

What is claimed is:

1. An electric discharge wire-cutting machine for processing a workpiece into an arbitrary shape by pulse discharge generated by applying a voltage between a wire electrode fed in a first direction and the workpiece, comprising:

a wire feeding means for feeding the wire electrode in the first direction while the workpiece is processed;

a wire winding means for providing a torque to the wire electrode in a second direction which is a reverse direction of the first direction;

a tension supplying means installed between said wire feeding means and said wire winding means for giving the wire electrode passing resistance and supplying the wire electrode on said wire feeding means side with tension;

a wire breakage detecting means for detecting a breakage in the wire electrode; and a wire end detecting means for detecting an end of the broken wire electrode, wherein when said wire breakage detecting means detects a breakage of the wire electrode, the wire electrode is wound up in the second direction by said wire winding means and the end of the broken wire electrode is positioned at a predetermined position by a detection of the end of the broken wire electrode by said wire end detecting means, wherein said tension supplying means can decrease the passing resistance and, when said wire breakage detecting means detects breakage of the wire electrode, said tension supplying means decreases the passing resistance making it easier for said wire winding means to wind up the broken wire electrode.

2. The electric discharge wire-cutting machine according to claim 1, wherein a feeding torque of the wire electrode in the first direction by said wire feeding means is larger than an amount of energizing torque of the wire electrode in the second direction applied by said wire winding means and a passing resistance torque applied by said tension supplying means.

3. The electric discharge wire-cutting machine as claimed in claim 1, wherein the wire winding means comprises a motor that rotates in a direction opposite to the first direction.

4. The electric discharge wire-cutting machine as claimed in claim 3, further comprising:

a brake means for braking said wire winding means, wherein said brake means is activated when said wire breakage detecting means detects the breakage of the wire electrode.

5. The electric discharge wire-cutting machine as claimed in claim 1, wherein said wire feeding means comprises a feed drive motor; a drive roller driven by the feed drive motor; and a pinch roller, said wire electrode being nipped between the pinch roller and the feed drive roller to draw the wire electrode from the feed bobbin.

6. The electric discharge wire-cutting machine as claimed in claim 1, wherein the tension supplying means comprises a tension brake; a brake roller; and a pinch roller, the wire electrode being sandwiched between the brake roller and the pinch roller.

7. The electric discharge wire-cutting machine as claimed in claim 1, wherein a speed of rotation of the wire winding means is less than a speed of feed in the first direction.

8. The electric discharge wire-cutting machine as claimed in claim 1, further comprising:

a torque stop means for stopping said wire winding means from providing the torque to the wire electrode when said wire breakage detecting means detects the breakage of the wire electrode.

9. An electric discharge wire-cutting machine, comprising:

an electrified workpiece;

a wire electrode for discharging a pulse to said workpiece by applying a voltage and processing said workpiece into an arbitrary shape;

a wire feeding means for feeding the wire electrode in a first direction while the electrified workpiece is processed;

a wire breakage detecting means for detecting a breakage of the wire electrode;

a wire winding means for providing a torque to the wire electrode in a second direction which is a reverse direction of the first direction when the wire electrode is fed in the first direction, and winding up the broken wire electrode in the second direction if said wire breakage detecting means detects the breakage of the wire electrode;

an energization stop means for momentarily stopping said wire winding means when said wire breakage detecting means detects the breakage of the wire electrode;

a tension supplying means installed between said wire feeding means and said wire winding means for giving the wire electrode passing resistance and supplying the wire electrode on said wire feeding means side with tension; and a wire and detecting means for detecting the end of the broken wire electrode, wherein a feeding torque of the wire electrode in the first direction by said wire feeding means is larger than an amount of the torque of the wire electrode in the second direction applied by said wire winding means and a passing resistance torque applied by said tension supplying means.

10. The electric discharge wire-cutting machine according to claim 1, wherein said tension supplying means has at least two passing resistances and, when said wire breakage detecting means detects the breakage of the wire electrode, said tension supplying means decreases the passing resistance from a high level to a low level making it easier for said wire winding means to wind up the broken wire electrode.

11. An electric discharge wire-cutting machine, comprising:
   a wire electrode;
   wire electrode feeding means for drawing the wire electrode in a wire electrode feed direction;
   a feed bobbin from which the wire electrode is drawn;
   a first tension generating mechanism linked to the feed bobbin;
   a second tension generating mechanism downstream in the wire feed direction from the feed bobbin;
   a breakage detection sensor linked to the second tension generating mechanism; and
   a wire end detecting sensor positioned between the second tension generating mechanism and the wire electrode feeding means, wherein the first tension generating mechanism comprises a motor that rotates in a direction opposite to the wire electrode feed direction and a speed of rotation of the motor is less than a speed of feed in the wire electrode feed direction produced by the wire electrode feeding means and said first tension generating means further comprises a brake means for momentarily stopping said motor when said breakage detection sensor detects a breakage of the wire electrode.

12. The electric discharge wire-cutting machine as claimed in claim 11, wherein said wire electrode feeding means comprises a feed drive motor; a drive roller driven by the feed drive motor; and a pinch roller, said wire electrode being nipped between the pinch roller and the feed drive roller to draw the wire electrode from the feed bobbin.

13. The electric discharge wire-cutting machine as claimed in claim 11, wherein the wire end detecting sensor is a reflecting photosensor.

14. The electric discharge wire-cutting machine as claimed in claim 11, wherein the second tension generating mechanism comprises a tension brake; a brake roller; and a pinch roller, the wire electrode being sandwiched between the brake roller and the pinch roller.

15. The electric discharge wire-cutting machine as claimed in claim 14, wherein the tension brake is an electromagnetic brake.

16. The electric discharge wire-cutting machine as claimed in claim 14, wherein the breakage detection sensor comprises an interrupter having a plurality of slits therein; and a photosensor adjacent to the interrupter, the interrupter being mounted on a rotational shaft of the tension brake.

17. An electric discharge wire-cutting machine for processing a workpiece by pulse discharge generated by applying a voltage between a wire electrode and the workpiece, comprising:
   wire feeding means for feeding the wire electrode in a first direction when the workpiece is processed;
   wire winding means for providing a torque to the wire electrode in a second direction which is a reverse direction to the first direction when the wire electrode is broken, said wire winding means winding up the broken wire electrode in the second directions;
   wire end detecting means for detecting an end of the broken wire electrode, said wire end detecting means detecting the end of the broken wire electrode wound up by said wire winding means;
   wire breakage detecting means for detecting the breakage of the wire electrode; and
   torque means for stopping said wire winding means from providing the torque to the wire electrode when said wire breakage detecting means detects the breakage of the wire electrode.

18. The electric discharge wire-cutting machine as claimed in claim 17, further comprising:
   tension supplying means installed between said wire feeding means and said wire winding means for providing the wire electrode passing resistance.

* * * * *